US011908319B2

(12) United States Patent
Li et al.

(10) Patent No.: US 11,908,319 B2
(45) Date of Patent: Feb. 20, 2024

(54) MULTI-GEOMAGNETIC SENSOR SPEED MEASUREMENT SYSTEM AND A SPEED MEASUREMENT METHOD USING THE SAME

(71) Applicant: XIDIAN UNIVERSITY, Shaanxi (CN)

(72) Inventors: Changle Li, Shaanxi (CN); Zhiqiang Chen, Shaanxi (CN); Guoqiang Mao, Shaanxi (CN); Yilong Hui, Shaanxi (CN); Yuexu Chen, Shaanxi (CN)

(73) Assignee: XIDIAN UNIVERSITY, Shaanxi (CN)

(*) Notice: Subject to any disclaimer, the term of this patent is extended or adjusted under 35 U.S.C. 154(b) by 185 days.

(21) Appl. No.: 17/427,573

(22) PCT Filed: Jul. 30, 2020

(86) PCT No.: PCT/CN2020/105798
§ 371 (c)(1),
(2) Date: Jul. 30, 2021

(87) PCT Pub. No.: WO2021/248655
PCT Pub. Date: Dec. 16, 2021

(65) Prior Publication Data

US 2022/0238016 A1 Jul. 28, 2022

(30) Foreign Application Priority Data

Jun. 11, 2020 (CN) ......................... 202010530549.7

(51) Int. Cl.
*G08G 1/052* (2006.01)
*G08G 1/042* (2006.01)

(52) U.S. Cl.
CPC ............. *G08G 1/052* (2013.01); *G08G 1/042* (2013.01)

(58) Field of Classification Search
CPC ............................... G08G 1/052; G08G 1/042
See application file for complete search history.

(56) References Cited

U.S. PATENT DOCUMENTS

2012/0253648 A1* 10/2012 Kim ....................... G08G 1/042 701/119
2021/0118291 A1* 4/2021 Qi .......................... G08G 1/052

FOREIGN PATENT DOCUMENTS

CN 106355897 1/2017
CN 106355898 A * 1/2017 ............ G08G 1/042

(Continued)

OTHER PUBLICATIONS

Office Action received for Australian Patent Application No. 2020429374, dated Jan. 4, 2023, 3 pages.

(Continued)

*Primary Examiner* — Joseph H Feild
*Assistant Examiner* — Sharmin Akhter
(74) *Attorney, Agent, or Firm* — Workman Nydegger

(57) ABSTRACT

A multi-geomagnetic sensor speed measurement system comprises a geomagnetic vehicle detection module, a data transmission module, a data reception module and a backend data processing module. When measuring, the geomagnetic vehicle detection module collects the geomagnetic data when the vehicle passes and processes it to obtain temporal data; the backend processing module receives the data for data cleaning; the backend processing module selects the reference sensors and opens individual time windows; the backend processing module processes the temporal data based on the number of temporal data in the time window; in the case of duplicate-detection, a measurement threshold δ is set and the temporal data is merged based on the threshold δ; in the case of mis-detection, the data is interpolated to make up for the mis-detection; based on the alignment result, a minimum variance method is used to estimate the speed of the vehicle.

8 Claims, 2 Drawing Sheets

(56) References Cited

FOREIGN PATENT DOCUMENTS

| | | | |
|---|---|---|---|
| CN | 106355898 | A | 1/2017 |
| CN | 108986482 | | 12/2018 |
| CN | 109859495 | | 6/2019 |
| CN | 109979194 | | 7/2019 |
| CN | 111311928 | | 6/2020 |
| KR | 101268899 | | 5/2013 |

OTHER PUBLICATIONS

Kun, L., "Research on Sepeed Measurement System Based on Geomagnetic Vehicle Detector," Journal of Test and Measurement Technology, vol. 33, No. 1, 2019, pp. 74-78.

Qiang, J., "Research on Velocity Measurement System Based on Geomagnetic Vehicle Detector," Viser Technology Pte.Ltd., vol. 2, No. 1, 2019, pp. 50-54.

2.5 Pre-processing of marine fisheries data, Marine Fishing 3S System Research and Application, Jul. 31, 2017, pp. 3.

Office Action received for Australian Patent Application No. 2020429374, dated Jul. 27, 2022, 3 pages.

Office Action received for Chinese Patent Application No. 202010530549.7, dated Apr. 6, 2021, 24 pages (14 pages of English Translation and 10 pages of Original Document).

Wenshuai, S., "Research on Vehicle Information Detection System Based on Geomagnetic Sensor," Thesis, Jan. 15, 2019, pp. 93 (English Abstract submitted).

* cited by examiner

MULTI-GEOMAGNETIC SENSOR SPEED MEASUREMENT SYSTEM AND A SPEED MEASUREMENT METHOD USING THE SAME

CROSS-REFERENCE TO RELATED PATENT APPLICATION

This application is a 371 US nationalization of PCT Patent Application No. PCT/CN2020/105798, filed Jul. 30, 2020, which claims the benefit of and priority to Chinese Patent Application No. 202010530549.7, filed Jun. 11, 2020. The entire content of the aforementioned patent applications is incorporated herein by reference.

TECHNICAL FIELD

The disclosure relates to a speed measurement system, and further relates to a multi-geomagnetic sensor speed measurement system and a speed measurement method using the same.

BACKGROUND

With the increase in car ownership, traffic accidents and traffic jams are frequent and intelligent management of traffic is imperative. Intelligent traffic systems are the main means of intelligent management of traffic, and information collection technology is widely used in intelligent traffic systems. The vehicle speed measurement system is an indispensable part of the intelligent traffic system, as it measures the speed of vehicles on the road and provides traffic data for the intelligent traffic system. The intelligent traffic system can identify speeding vehicles and give warnings to speeding vehicles after obtaining speed information, thus avoiding traffic accidents caused by speeding vehicles and thus improving traffic safety.

Conventional vehicle speed measurement systems currently in use at home and abroad use optical, microwave radar, inductive coil and geomagnetic sensors to collect traffic data, and the controller analyses the data to obtain the speed of the vehicle. However, optical sensors have high environmental requirements and can affect speed measurement in bad weather such as haze; inductive coil sensors have a short life span; when there are multiple vehicles driving side by side in the same direction, or when there are large vehicles passing in adjacent lanes, speed measurement systems using microwave radar and traditional geomagnetic sensors are prone to not detecting vehicles or incorrectly detecting vehicles, resulting in speed measurement errors. Conventional vehicle speed measurement systems lack practicality, reliability, safety and are too limited to meet the requirements of large-scale deployment.

SUMMARY

The purpose of the disclosure is to propose a multi-geomagnetic sensor speed measurement system and a speed measurement method thereof in order to improve the accuracy of speed measurement and promote the intelligent development of highways, in view of the above-mentioned shortcomings of the prior art.

To achieve the above purpose, the disclosure discloses a multi-geomagnetic sensors speed measurement system comprising a geomagnetic vehicle detection module, a data transmission module, a data reception module and a backend data processing module, the geomagnetic vehicle detection module being wired to the data transmission module, the data transmission module being wirelessly connected to the data reception module, and the data reception module being wired to the backend data processing module.

The multi-geomagnetic sensor speed measurement system comprises number M of geomagnetic vehicle detection modules, and the geomagnetic vehicle detection modules are deployed in groups along the roadside, wherein every two or more geomagnetic vehicle detection modules are grouped together. Each geomagnetic vehicle detection module comprises a group of geomagnetic sensors and a controller. The geomagnetic sensors are used to collect magnetic field data from the road surface. Adjacent geomagnetic sensors are spaced by d meters. The controller is used to receive data collected by the geomagnetic sensors, to analyze the temporal data used by the vehicles passing the geomagnetic vehicle detection module and to transmit the temporal data to the data transmission module at intervals which can be set to x seconds or y minutes, depending on actual requirements.

The data transmission module receives the temporal data using a wireless transmitter and sends it to the data reception module by wireless communication.

The data reception module receives the temporal data reported by the data transmission module using a wireless transmitter and transmits it to the backend data processing module.

The backend data processing module is used for processing the temporal data. The processing comprises aligning the acquired data, matching the temporal data with the corresponding vehicle to each other and calculating the speed of the vehicle as it passes the group of geomagnetic sensors based on the aligned data.

The speed measurement method of the disclosure using a multi-geomagnetic sensor speed measurement system comprises the steps of:

1) Collecting the geomagnetic data as the vehicle passes using the geomagnetic vehicle detection module for threshold detection processing to obtain temporal data which comprises data on the time spent for the vehicle to approach and leave the geomagnetic sensor, the step of collecting the geomagnetic data as the vehicle passes using the geomagnetic vehicle detection module for threshold detection processing comprises the steps of:

1a) Collecting the corresponding geomagnetic data in real time using the geomagnetic sensors in the geomagnetic vehicle detection module and sending it to the controller in the geomagnetic vehicle detection module; and 1b) Comparing the collected data with a set threshold using the controller of the geomagnetic vehicle detection module to determine whether the vehicle is approaching or leaving the geomagnetic sensor and to obtain the temporal data for the vehicle approaching or leaving the geomagnetic sensor;

2) Merging the temporal data into a group of data using the geomagnetic vehicle detection module, the merged temporal data is sent by the data transmission module to the data reception module which sends the temporal data to the backend processing module;

3) Performing data cleaning of the received temporal data using the backend processing module, the step of performing data cleaning of the received temporal data using the backend processing module comprises the steps of 3a) removing obviously abnormal data based on the upper limit threshold Th3 and the lower data limit threshold Th4 using the backend processing module; and 3b) determining whether there is a situation where multiple data are generated when a single vehicle passes, i.e. duplicate-detection, based on the data increase threshold Th using the backend processing module for every two adjacent temporal data, and deleting this part of the data when duplicate-detection occur;

4) Re-grouping of temporal data after data cleaning using the backend processing module;

5) Selecting reference sensors for the same group of temporal data using the backend processing module and creating individual time windows;

6) Processing the temporal data accordingly based on the number of times in the time window using the backend processing module;

7) Setting the measurement threshold δ and merging of temporal data based on the measurement threshold δ when there are multiple temporal data corresponding in the time window;

8) Confirming that a mis-detection has occurred when there is no temporal data corresponding in the time window, i.e. the vehicle has passed by but not been detected, and compensating the mis-detection data by interpolation;

9) Determining that the data is correct at this time when there is a temporal data correspondence in the time window, then determining whether each group of data has been data aligned after getting the data alignment result according to step 5) to step 8), if yes, executing step 10), if not, executing step 5);

10) Estimating the speed of vehicle based on alignment results using a minimum variance method to calculate the speed of the vehicle.

The disclosure has the following advantages over the prior art.

Firstly, it can effectively avoid the problem of incorrect vehicle speed measurement caused by not detecting a vehicle or detecting a vehicle as multiple vehicles.

Conventional sensor speed measurement schemes generally have disadvantages that make it difficult to meet the reliability and safety requirements in scenarios with complex and changing traffic conditions. The disclosure can effectively avoid the problem of vehicle speed measurement errors caused by vehicles not being detected or by detecting one vehicle as multiple vehicles due to data cleaning and data alignment operations.

Secondly, the disclosure uses multi-geomagnetic sensors to collect road data, and makes full use of the advantages of multiple sensors to co-ordinate the results of each sensor for speed estimation using the minimum variance method to improve accuracy, which is more advantageous and practical for vehicle speed measurement.

Thirdly, the disclosure uses geomagnetic sensors which are low cost and easy to deploy on a large scale, and the geomagnetic sensors do not react to non-ferromagnetic objects, so they can be effective with less interference.

Fourthly, the inventive system is less affected by environmental factors and can still work normally in rainy or foggy weather.

DETAILED DESCRIPTION OF EMBODIMENT(S)

Embodiments of the disclosure are further described below in conjunction with the accompanying drawings.

Figure 1:
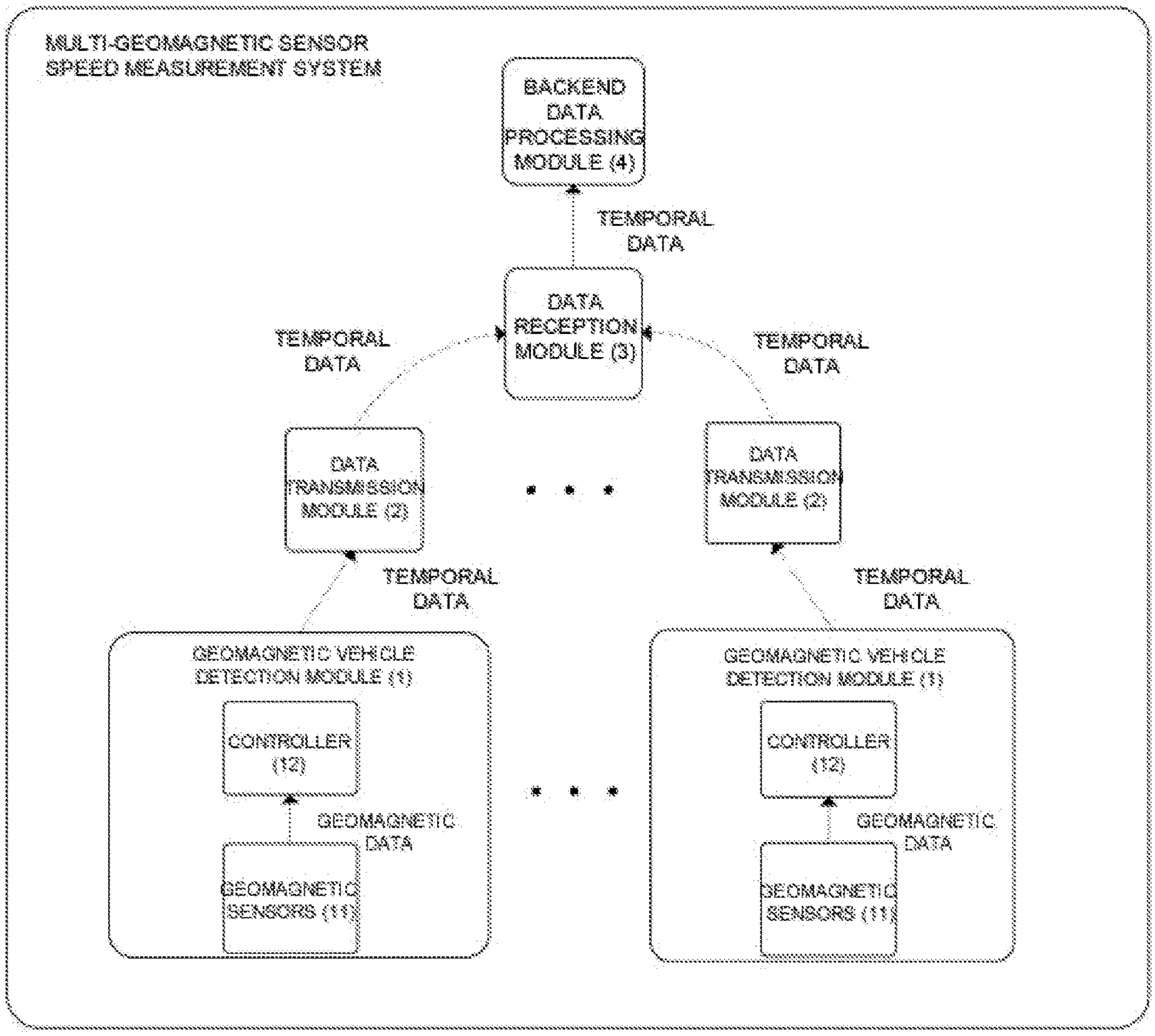
FIG. 1 shows a block diagram of the structure of the system of the disclosure.

Referring to FIG. 1, the multi-geomagnetic sensor speed measurement system of the disclosure comprises a geomagnetic vehicle detection module 1, a data transmission module 2, a data reception module 3 and a backend data processing module 4. The geomagnetic vehicle detection module 1 is wired to the data transmission module 2, the data transmission module 2 is wirelessly connected to the data reception module 3 and the data reception module 3 is wired to the backend data processing module 4. The multi-geomagnetic sensor speed measurement system comprises a number M of geomagnetic vehicle detection modules 1, which are deployed in groups along the roadside, where every two or more geomagnetic vehicle detection modules 1 are grouped together. Each geomagnetic vehicle detection module 1 comprises a group of geomagnetic sensors 11 and a controller 12, the geomagnetic sensors 11 are used to collect magnetic field data from the road surface, adjacent geomagnetic sensors 11 are spaced by d meters. The controller is used to receive the data collected by the geomagnetic sensors 11, to analyse the temporal data used by the vehicles passing the geomagnetic vehicle detection module 1 and to transmit the temporal data to the data transmission module 2 at intervals which can be set to x seconds or y minutes. The data transmission module 2 uses a wireless transmitter to receive the temporal data and sends it to the data reception module 3 by wireless communication; the data reception module 3 uses a wireless transmitter to receive the temporal data reported by the data transmission module 3 and transmits it to the backend data processing module 4; the backend data processing module 4 is used to process the temporal data, which comprises aligning the acquired data, aligning the temporal data with the corresponding vehicle and calculating the speed of the vehicle as it passes the group of geomagnetic sensors based on the aligned data.

Figure 2:
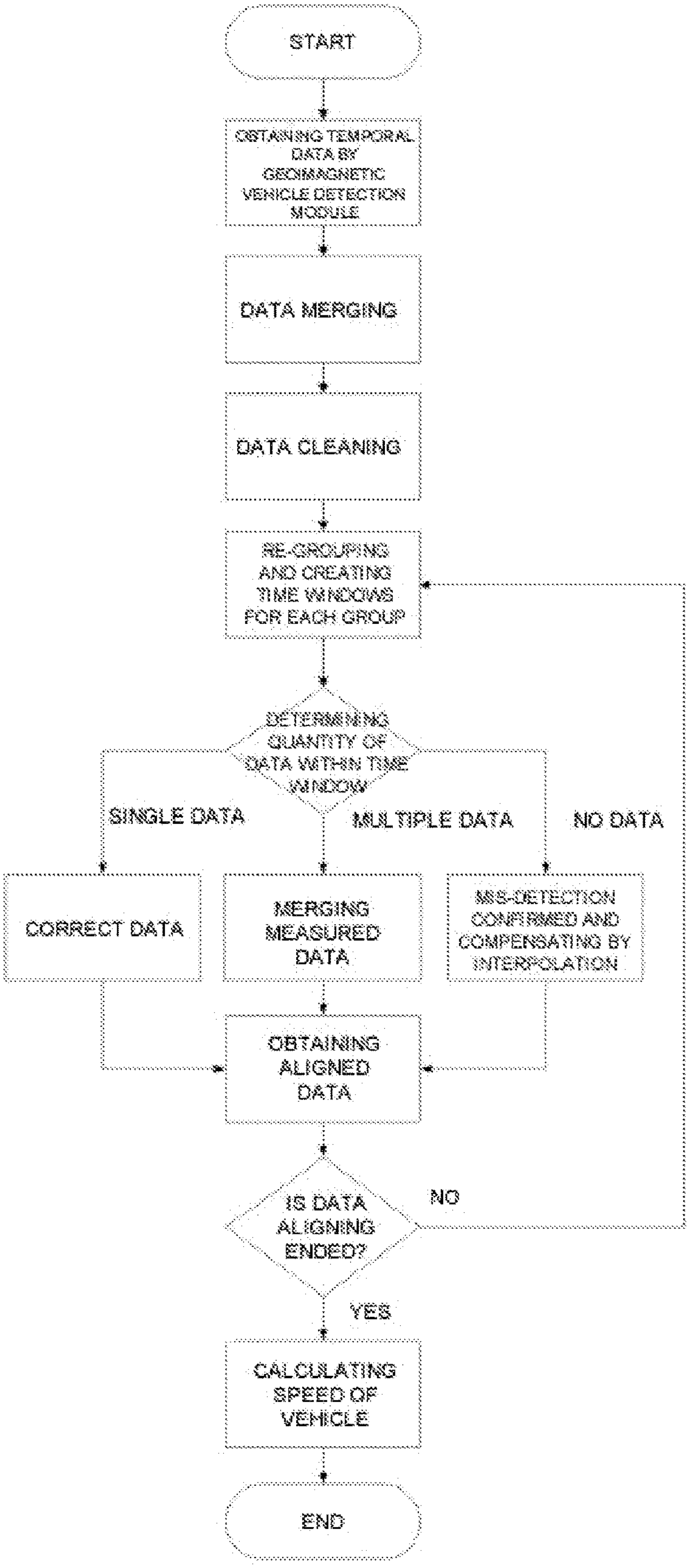
FIG. 2 shows a flow chart of the implementation of the method of The disclosure.

Referring to FIG. 2, this example of a method of vehicle speed measurement using the above-mentioned multi-geomagnetic sensor speed measurement system is implemented in the following steps:

Step 1, collecting the geomagnetic data of the vehicle passing for threshold detection processing using the geomagnetic vehicle detection module 1 to obtain temporal data which comprises data on the time spent for the vehicle to approach and leave the geomagnetic sensor 11. The step of collecting the geomagnetic data of the vehicle passing for threshold detection processing using the geomagnetic vehicle detection module 1 comprises the following steps:

1) Collecting the corresponding geomagnetic data in real time using the geomagnetic sensor 11 in the geomagnetic vehicle detection module 1 and sending it to the controller 12 in the geomagnetic vehicle detection module 1;

When a vehicle passes the detection area of the geomagnetic sensor 11, the magnetic flux in the detection area of the geomagnetic sensor 11 changes dramatically and the change in magnetic flux is reflected in a corresponding increase or decrease in the output data of the geomagnetic sensor 11. By deploying the geomagnetic sensor module 1 alongside the road, the changes in the output data of the geomagnetic sensor 11 can be used to detect the passage of vehicles in real time. The geomagnetic sensor 11 transmits the output data to the controller 12 of the geomagnetic vehicle detection module 1;

1) Comparing the geomagnetic data from the geomagnetic sensor 11 with a high geomagnetic data threshold Th1;

If the geomagnetic data from sensor 11 is above the high geomagnetic data threshold Th1, then it is continuously determined whether the incoming data is above the high geomagnetic data threshold for a period of time $\Delta t$; if yes, it is recorded by a timer and then step 1.4) is performed, if not, it is determined to be interference from an adjacent reverse lane and no recording is performed; and If the geomagnetic data from geomagnetic sensor 11 is below the high geomagnetic data threshold Th1, then it is determined that the vehicle is not close to the geomagnetic sensor 11 and no processing is performed;

The values of the high geomagnetic threshold Th1 and the time thresholds $\Delta t$ are based on the actual waveform results obtained from the field test;

1) Comparing the geomagnetic data from geomagnetic sensor 11 with a low geomagnetic data threshold Th2;

If the geomagnetic data from geomagnetic sensor 11 is below the low geomagnetic data threshold Th2, then continue to determine if the incoming data is below the low geomagnetic data threshold for a period of time $\Delta t$; if yes, it is recorded by a timer, if not, it is determined that the vehicle has not left the detection area of the geomagnetic sensor 11 and no recording is performed; and If the geomagnetic data from geomagnetic sensor 11 is higher than the low geomagnetic data threshold Th2, the vehicle is considered to not having left the geomagnetic sensor 11 and continues to wait until the geomagnetic data from the geomagnetic sensor 11 is below the low geomagnetic data threshold Th2;

The value of the low geomagnetic threshold Th2 is based on the waveform results obtained from actual tests in the field.

Step 2, merging the temporal data into a group of data using the geomagnetic vehicle detection module 1. The merged temporal data is sent by the data transmission module 2 to the data reception module 3 which sends the temporal data to the backend processing module 4.

The geomagnetic vehicle detection module 1 combines temporal data into a group of data, meaning that the temporal data over a period of time is merged into a group of data, which can be set to x seconds or y minutes.

Step 3, performing a data cleaning process on the received temporal data using the backend processing module 4. The step of performing a data cleaning process on the received temporal data using the backend processing module 4 comprises the following steps:

3.1) Setting an upper data limit threshold Th3, a lower data limit thresholds Th4 and a data increase threshold Th using the backend processing module 4 to so that when the data reported by the geomagnetic sensor 11 is higher the upper data limit threshold Th3 or lower than the lower data limit threshold Th4, the data is discarded, thus removing the data that is clearly abnormal. The data increase threshold Th is the ratio of the adjacent sensor distance to the road speed limit. The upper data limit threshold Th3 is the last temporal data in the set. The lower data limit threshold Th4 is the first temporal data in the data set;

3.2) Processing each of the two adjacent temporal data using the backend processing module 4, and determining that there is a case of detecting one vehicle as multiple vehicles at that point when the latter data is lower than the former data plus the data increase threshold Th, and removing the latter of the two adjacent data.

Step 4, regrouping the temporal data after data cleaning using the backend processing module 4.

The temporal data after data cleaning is regrouped using the backend processing module 4 so that the value of the a-th group of data is in turn the a-th temporal data in each group of temporal data.

Step 5, selecting a reference sensor for the same group of temporal data using the backend processing module 4 and creating individual time windows. The step of selecting a reference sensor for the same group of temporal data using the backend processing module 4 and creating individual time windows comprises the following steps:

5.1) Processing the first group of temporal data by default using the backend processing module 4, process the second group of data when step 5 is executed again, and so on, setting the geomagnetic sensor 11 with the smallest uploaded temporal data value in the same group of temporal data as the reference sensor for each processing; and 5.2) Creating individual time windows for the reference sensor based on Eq. $[\hat{t}_{i,1}-\hat{\eta}_{i,j}, \hat{t}_{i,1}+\hat{\eta}_{i,j}]$ using the backend processing module 4, and dividing the time difference between the first and last sensor passed by the same group of vehicles into equally spaced time units, where $\eta_i$, $$\eta_{i,j} = |j-i| \cdot \frac{\left(\frac{d}{v}\right)^2}{v}$$

milliseconds and d is the interval between adjacent geomagnetic sensors 11, and v is the road speed limit value, where $\hat{t}_{i,1}$ is the measurement time of the i-th geomagnetic sensor 11 in each group the corresponding to the time when the first vehicle passes, where the i-th geomagnetic sensor 11 is the reference sensor for the j-th geomagnetic sensor 11.

Step 6, performing the processing accordingly based on the number of temporal data in the time window using the backend processing module 4.

Step 7, setting a measurement threshold $\delta$ when there is a plurality of temporal data corresponding in the time window and merging the temporal data based on the measurement threshold $\delta$. The step of setting the measurement threshold $\delta$ and merging the temporal data based on the measurement threshold $\delta$ comprises the following steps:

7.1) If the measurement threshold $\delta$ has been obtained then step 7.2) is performed;

If the measurement threshold $\delta$ has not been obtained, the geomagnetic sensor 11 is placed beside the road to record the output waveform generated by the geomagnetic sensor 11 when the vehicle passes the geomagnetic sensor 11 in the case of a vehicle being detected as multiple vehicles. The difference data of adjacent detection times is obtained by waveform analysis. The operation is repeated several times. A Gaussian distribution model $$f(x) = \frac{1}{\sqrt{2\pi}\,\sigma} e^{-\frac{(x-\mu)^2}{2\sigma^2}}$$

is established based on the difference data, where σ is the standard deviation, μ is the mean value, and the measurement threshold δ is taken as f(x=μ−3σ); and 7.2) Comparing the difference between each adjacent temporal data with the measurement threshold δ;

If the difference between adjacent temporal data is less than the measurement threshold δ, the temporal data with the smallest value is retained and the other temporal data are deleted;

If the difference between the adjacent temporal data is not less than the measurement threshold δ, the temporal data closest in value to the temporal data of the reference sensor is retained and the other temporal data is deleted.

Step 8, confirming that a mis-detection has occurred is when there is no temporal data corresponding in the time window, i.e. the vehicle passes but is not detected, and the mis-detection data is compensated by interpolation. The step of compensating the mis-detection data by interpolation comprises the following steps:

Performing different interpolations at a position in the convoy using the backend processing module 4 based on the temporal data $\hat{t}_{j,k}$;

If $\hat{t}_{j,k}$ is the temporal data for the middle of the convoy, the compensation formula is:

$$\hat{t}_{j,k} = \hat{t}_{j,k-1} + \frac{\hat{t}_{i,k} - \hat{t}_{i,k-1}}{\hat{t}_{i,k+1} - \hat{t}_{i,k-1}}\left(\hat{t}_{j,k+1} - \hat{t}_{j,k-1}\right)$$

If $\hat{t}_{j,k}$ is the temporal data at the end of the convoy, the compensation formula is:

$$\hat{t}_{j,k} = \hat{t}_{j,k-1} + \frac{\hat{t}_{i,k} - \hat{t}_{i,k-1}}{\hat{t}_{i,k-1} - \hat{t}_{i,k-2}}\left(\hat{t}_{j,k+1} - \hat{t}_{j,k-2}\right)$$

If $\hat{t}_{j,k}$ is the temporal data at the head of the convoy, the compensation formula is:

$$\hat{t}_{j,1} = \hat{t}_{j,2} + \frac{\hat{t}_{i,2} - \hat{t}_{i,1}}{\hat{t}_{i,3} - \hat{t}_{i,k-2}}\left(\hat{t}_{j,3} - \hat{t}_{j,2}\right)$$

where $\hat{t}_{i,k}$ is the measurement time of the k-th vehicle in each group passing the i-th geomagnetic sensor 11 in each group, and $\hat{t}_{j,k}$ is the measurement time of the k-th vehicle in each group passing the j-th geomagnetic sensor 11 in each group, and $\hat{t}_{j,1}$ is the measurement time of the first vehicle in each group passing the j-th geomagnetic sensor 11 in each group, and similarly $\hat{t}_{j,k-1}$ is the measurement time of the k−1-th vehicle in each group passing the j-th geomagnetic sensor 11 in each group, and $\hat{t}_{i,1}$ is the measurement time of the first vehicle in each group passing the i-th geomagnetic sensor 11 in each group, and $\hat{t}_{j,k+1}$, $\hat{t}_{j,k-2}$, $\hat{t}_{i,k-1}$, $\hat{t}_{i,k-2}$, $\hat{t}_{i,2}$, $\hat{t}_{i,3}$, $\hat{t}_{j,2}$, $\hat{t}_{j,3}$ and so on.

Step 9, determining that the data is correct at this time when there is a temporal data correspondence in the time window. Determining whether each group of data has been data aligned after getting the data alignment result according to step 5 to step 8, if yes, then perform step 10, if not, then perform step 5.

Step 10, estimating the speed of the vehicle using the minimum variance method based on the alignment results, and calculating the speed of the vehicle.

The vehicle speed is estimated from the alignment results using the minimum variance method, i.e. the speed is calculated using the following equation:

$$\frac{\sum_{i=0}^{m}(L_i - x_{k0})^2}{v_k} - \sum_{i=0}^{m}(L_i - x_{k0})\hat{t}_{i,k} = 0$$

where $v_k$ is the speed of the k-th vehicle, and $x_{k0}$ is the position of the k-th vehicle at moment 0. Setting the position of the first geomagnetic sensor 11 in each group of geomagnetic sensors 11 as the origin. $\hat{t}_{i,k}$ is the measurement time when the i-th vehicle corresponding to the k-th geomagnetic sensor 11 in each group of geomagnetic sensors 11 passes, and $L_i$ is the distance from the i-th geomagnetic sensor 11 to the origin.

The foregoing is only a preferred embodiment of The disclosure and is not intended to limit The disclosure. It is clear that any professional in the field, after understanding the content and principles of The disclosure, may make various modifications and changes in form and detail without departing from the principles and structure of The disclosure, but these modifications and changes based on the ideas of The disclosure are still within the scope of protection of the claims of The disclosure.

The invention claimed is:

1. A speed measurement method using a multi-geomagnetic sensor speed measurement system, wherein the multi-geomagnetic sensor speed measurement system comprises a geomagnetic vehicle detection module, a data transmission module, a data reception module, and a backend data processor, wherein the geomagnetic vehicle detection module is wired to the data transmission module, the data transmission module is wirelessly connected to the data reception module, and the data reception module is wired to the backend data processor, wherein the multi-geomagnetic sensor speed measurement system comprises number M of the geomagnetic vehicle detection modules, and the geomagnetic vehicle detection modules are deployed in groups along a roadside, wherein every two or more of the geomagnetic vehicle detection modules are grouped together, wherein each geomagnetic vehicle detection module comprises a group of geomagnetic sensors and a controller, the geomagnetic sensors are used to collect magnetic field data on a road surface, adjacent geomagnetic sensors are spaced by d meters, the controller is used to receive data collected by the geomagnetic sensors in order to analyze temporal data used by vehicles passing the geomagnetic vehicle detection module and to transmit the temporal data to the data transmission module at intervals, the intervals being set to x seconds or y minutes based on an actual demand, wherein the data transmission module receives the temporal data using a wireless transmitter and sends it to the data reception module in wireless communication, wherein the data reception module receives the temporal data reported by the data transmission module using the wireless transmitter and transmits it to the backend data processor, wherein the backend data processor is used to process the temporal data, the processing comprising aligning acquired data, corresponding the temporal data to a corresponding vehicle and calculating a speed of the vehicle as it passes the group of the geomagnetic sensors based on the aligned data, and wherein, the speed measurement method comprises:

1) collecting geomagnetic data as the vehicle passes using the geomagnetic vehicle detection module for threshold detection processing to obtain temporal data which comprises data on a time spent for the vehicle to approach and leave the geomagnetic sensor, the step of collecting geomagnetic data as the vehicle passes using the geomagnetic vehicle detection module for threshold detection processing comprising:

1a) collecting corresponding geomagnetic data in real time using the geomagnetic sensors in the geomagnetic vehicle detection module to send to the controller in the geomagnetic vehicle detection module; and 1b) comparing the collected data with a set threshold value using the controller of the geomagnetic vehicle detection module to determine whether the vehicle is approaching or leaving the geomagnetic sensor and to obtain the temporal data for the vehicle approaching or leaving the geomagnetic sensor;

2) merging the temporal data into a group of data using the geomagnetic vehicle detection module, the merged temporal data is sent to the data reception module by means of the data transmission module which sends the temporal data to the backend processor;

3) performing data cleaning of the received temporal data using the backend processor, the step of performing data cleaning of the received temporal data using the backend processor comprising:

3a) removing data that is clearly abnormal based on an upper limit threshold Th3, a lower data limit threshold Th4, and a data increase threshold Th using the backend processor; and 3b) determining whether there is a situation where multiple data are generated when a single vehicle passes, i.e. duplicate-detection, based on a data increase threshold Th (b) using the backend processor for every two adjacent temporal data, and deleting this part of the data when duplicate-detection occur;

4) regrouping of temporal data after data cleaning using the backend processing module processor;

5) selecting a reference sensor for a same group of temporal data using the backend processor and creating individual time windows;

6) processing the temporal data accordingly based on the number of temporal data in the time window using the backend processor;

7) setting a measurement threshold $\delta$ when there are multiple temporal data corresponding in the time window, and merging the temporal data based on the measurement threshold $\delta$;

8) confirming that a mis-detection has occurred when there is no temporal data corresponding in the time window, i.e. the vehicle has passed by but not been detected, and compensating the mis-detection data by interpolation;

9) determining that the data is correct at this time when there is a temporal data correspondence in the time window, and determining whether each group of data has been data aligned after getting a data alignment result according to step 5) to step 8), if yes, executing step 10), if not, executing step 5); and 10) estimating the speed of vehicle based on alignment results using a minimum variance method to calculate the speed of the vehicle.

2. The speed measurement method according to claim 1, wherein, in step 1a), real-time collection of corresponding geomagnetic data using the geomagnetic sensor in the geomagnetic vehicle detection module comprises collecting the geomagnetic data caused by changes in magnetic flux output to the controller of the geomagnetic vehicle detection module when a vehicle passes the geomagnetic sensor corresponding increase or decrease in value.

3. The speed measurement method according to claim 1, wherein, in step 1b) the controller of the geomagnetic vehicle detection module is used to compare the collected data with a set threshold value to determine whether the vehicle is approaching or leaving the geomagnetic sensor and to obtain the temporal data for the vehicle approaching or leaving the geomagnetic sensor, by the following steps:

1b1) comparing the geomagnetic data from the geomagnetic sensor with a high geomagnetic data threshold Th1, if the geomagnetic data from the geomagnetic sensor is above the high geomagnetic data threshold Th1, then it is continuously determined whether incoming data is above the high geomagnetic data threshold for a period of time $\Delta t$; if yes, it is recorded by a timer and then step 1.4) is performed, if not, it is determined to be interference from an adjacent reverse lane and no recording is performed; and if the geomagnetic data from the geomagnetic sensor is below the high geomagnetic data threshold Th1, then it is determined that the vehicle is not close to the geomagnetic sensor and no processing is performed; and 1b2) comparing the geomagnetic data from the geomagnetic sensor with a low geomagnetic data threshold Th2;

if the geomagnetic data from the geomagnetic sensor is below the low geomagnetic data threshold Th2, then continue to determine if the incoming data is below the low geomagnetic data threshold for a period of time $\Delta t$; if yes, it is recorded by a timer, if not, it is determined that the vehicle has not left a detection area of the geomagnetic sensor and no recording is performed; and if the geomagnetic data from geomagnetic sensor is higher than the low geomagnetic data threshold Th2, the vehicle is considered to not having left the geomagnetic sensor and continues to wait until the geomagnetic data from the geomagnetic sensor is below the low geomagnetic data threshold Th2, and wherein the high geomagnetic threshold Th1, the low geomagnetic threshold Th2 and the time threshold $\Delta t$ are based on the results of actual waveforms tested in the field.

4. The speed measurement method according to claim 1, wherein, in step 3) the data cleaning of the received temporal data using the backend processor is achieved by the steps of:

3a) setting an upper data limit threshold Th3, a lower data limit thresholds Th4 and a data increase threshold Th using the backend processor 4 to so that when the data reported by the geomagnetic sensor is higher the upper data limit threshold Th3 or lower than the lower data limit threshold Th4, the data is discarded, thus removing the data that is clearly abnormal; the data increase threshold Th is a ratio of an adjacent sensor distance to the road speed limit; the upper data limit threshold Th3 is the last temporal data in the set; and the lower data limit threshold Th4 is the first temporal data in the data set; and 3b) processing each of the two adjacent temporal data using the backend processor, and determining that there is a case of detecting one vehicle as multiple vehicles at that point when the latter data is lower than the former data plus the data increase threshold Th, and removing the latter of the two adjacent data.

5. The speed measurement method according to claim 1, wherein, in step 5), selecting a reference sensor for the same group of temporal data using the backend processor and creating individual time windows is achieved by the steps of:

5a) processing the first group of temporal data by default using the backend processor, process the second group of data when step 5) is executed again, and so on, setting the geomagnetic sensor with the smallest uploaded temporal data value in the same group of temporal data as the reference sensor for each processing; and 5b) creating individual time windows for the reference sensor based on Eq. $[\hat{t}_{i,1}-\hat{\eta}_i, j, \hat{t}_{i,1}+\hat{\eta}_{i,j}]$ using the backend processor, and dividing the time difference between the first and last sensor passed by the same group of vehicles into equally spaced time units, where $$\eta_{i,j} = |j-i| \cdot \frac{\left(\frac{d}{v}\right)^2}{v}$$

milliseconds and d is the interval between adjacent geomagnetic sensors, and v is the road speed limit value, where $\hat{\hat{t}}_{i,1}$ the measurement time of the i-th geomagnetic sensor in each group the corresponding to the time when the first vehicle passes, and where the i-th geomagnetic sensor is the reference sensor for the j-th geomagnetic sensor.

6. The speed measurement method according to claim 1, wherein, in step 7), setting a measurement threshold δ and merging the temporal data based on the measurement threshold δ is achieved by the step of:

7a) if the measurement threshold δ has been obtained then step 7b) is performed;

if the measurement threshold δ has not been obtained, the geomagnetic sensor is placed beside the road to record an output waveform generated by the geomagnetic sensor when the vehicle passes the geomagnetic sensor in the case of a vehicle being detected as multiple vehicles; difference data of adjacent detection times is obtained by waveform analysis; an operation is repeated several times; and a Gaussian distribution model $$f(x) = \frac{1}{\sqrt{2\pi}\sigma} e^{-\frac{(x-\mu)^2}{2\sigma^2}}$$

is established based on the difference data, where σ is a standard deviation, μ is the mean value, and the measurement threshold δ is taken as f(x=μ−3σ); and 7b) comparing the difference between each adjacent temporal data with the measurement threshold δ;

if the difference between adjacent temporal data is less than the measurement threshold δ, the temporal data with the smallest value is retained and the other temporal data are deleted; and if the difference between the adjacent temporal data is not less than the measurement threshold δ, the temporal data closest in value to the temporal data of the reference sensor is retained and the other temporal data is deleted.

7. The speed measurement method according to claim 1, wherein, in step 8), compensating the mis-detection data by interpolation is achieved by the steps of:

performing different interpolations at a position in a convoy based on temporal data $\hat{t}_{j,k}$;

if $\hat{t}_{j,k}$ is temporal data for the middle of the convoy, the compensation formula is:

$$\hat{t}_{j,k} = \hat{t}_{j,k-1} + \frac{\hat{t}_{i,k} - \hat{t}_{i,k-1}}{\hat{t}_{i,k+1} - \hat{t}_{i,k-1}}(\hat{t}_{j,k+1} - \hat{t}_{j,k-1}),$$

if $\hat{t}_{j,k}$ is the temporal data at the end of the convoy, the compensation formula is:

$$\hat{t}_{j,k} = \hat{t}_{j,k-1} + \frac{\hat{t}_{i,k} - \hat{t}_{i,k-1}}{\hat{t}_{i,k-1} - \hat{t}_{i,k-2}}(\hat{t}_{j,k+1} - \hat{t}_{j,k-2}),$$

and if $\hat{t}_{j,k}$ is the temporal data at the head of the convoy, the compensation formula is:

$$\hat{t}_{j,1} = \hat{t}_{j,2} + \frac{\hat{t}_{i,2} - \hat{t}_{i,1}}{\hat{t}_{i,3} - \hat{t}_{i,k-2}}(\hat{t}_{j,3} - \hat{t}_{j,2}),$$

where $\hat{t}_{i,k}$ is a measurement time of a k-th vehicle in each group passing an i-th geomagnetic sensor in each group, and $\hat{t}_{j,k}$ is a measurement time of a k-th vehicle in each group passing a j-th geomagnetic sensor in each group, and $\hat{t}_{j,1}$ is a measurement time of a first vehicle in each group passing the j-th geomagnetic sensor in each group, and similarly $\hat{t}_{j,k-1}$ is a measurement time of a k−1-th vehicle in each group passing the j-th geomagnetic sensor in each group, and $\hat{t}_{i,1}$ is the measurement time of the first vehicle in each group passing the i-th geomagnetic sensor in each group, and $t\hat{i}_{j,k+1}$ is a measurement time of the k+1-th vehicle in each group passing the j-th geomagnetic sensor in each group, and $\hat{t}_{j,k-2}$ is a measurement time of the k−2-th vehicle in each group passing the j-th geomagnetic sensor in each group, and $\hat{t}_{i,k-1}$ is the measurement time of the k−1-th vehicle in each group passing the i-th geomagnetic sensor in each group, and $\hat{t}_{i,k-2}$ is the measurement time of the k−2-th vehicle in each group passing the i-th geomagnetic sensor in each group, and $\hat{t}_{i,2}$ is the measurement time of the second vehicle in each group passing the i-th geomagnetic sensor in each group, and $\hat{t}_{i,3}$ is the measurement time of the third vehicle in each group passing the i-th geomagnetic sensor in each group, and $\hat{t}_{j,2}$ is the measurement time of the second vehicle in each group passing the j-th geomagnetic sensor in each group, and $\hat{t}_{i,3}$ is the measurement time of the third vehicle in each group passing the j-th geomagnetic sensor in each group.

8. The speed measurement method according to claim 1, wherein, in step 10), estimating the speed of the vehicle using the minimum variance method based on the alignment results comprises calculating the speed by means of the following equation:

$$\frac{\sum_{i=0}^{m}(L_i - x_{k0})^2}{v_k} - \sum_{i=0}^{m}(L_i - x_{k0})\hat{t}_{i,k} = 0,$$

where $v_k$ is a speed of a k-th vehicle, and $x_{k0}$ is a position of the k-th vehicle at moment 0; and setting the position of the first geomagnetic sensor in each group of geomagnetic sensors as the origin;

where $\hat{t}_{i,k}$ is a measurement time when an i-th vehicle corresponding to a k-th geomagnetic sensor in each group of geomagnetic sensors passes, and $L_i$ is a distance from the i-th geomagnetic sensor to the origin.

* * * * *